(12) United States Patent
Wilton et al.

(10) Patent No.: US 11,615,442 B2
(45) Date of Patent: *Mar. 28, 2023

(54) SYSTEMS AND METHODS FOR PROGRAMMATIC TARGETED DIGITAL ADVERTISING

(71) Applicant: PERPETUAL MEDIA, LLC, Marina Del Rey, CA (US)

(72) Inventors: Brandon Wilton, Marina Del Rey, CA (US); Jay Wilton, Marina Del Rey, CA (US)

(73) Assignee: PERPETUAL MEDIA, LLC, Marina Del Ray, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/323,173

(22) Filed: May 18, 2021

(65) Prior Publication Data

US 2021/0272163 A1    Sep. 2, 2021

Related U.S. Application Data

(63) Continuation of application No. 16/252,283, filed on Jan. 18, 2019, now Pat. No. 11,080,759, which is a
(Continued)

(51) Int. Cl.
*G06Q 30/02* (2012.01)
*G06Q 30/0251* (2023.01)
(Continued)

(52) U.S. Cl.
CPC ..... *G06Q 30/0269* (2013.01); *G06Q 30/0271* (2013.01); *G06Q 30/0275* (2013.01);
(Continued)

(58) Field of Classification Search
CPC .................................................. G06Q 30/0269
See application file for complete search history.

(56) References Cited

U.S. PATENT DOCUMENTS 5,305,195 A    4/1994  Murphy
6,381,626 B1   4/2002  De Leo et al.
(Continued)

OTHER PUBLICATIONS

Liz Benston, Technology Allows Advertising on Idle Slot Machines, Las Vegas Sun Newspaper, Jul. 3, 2010, https://lasvegassun.corn/news/201 0/jul/03/slots-offer-ad-exposure/.
Ben Kneen, How Real Time Bidding, DSPS, SSPS, and Ad Exchanges Work, Ad Ops Insider, Dec. 8, 2010, http://www.adopsinsider.com/ad-serving/how-dsps-ssps-and-ad-exchanges-work/.

*Primary Examiner* — Azam A Ansari
(74) *Attorney, Agent, or Firm* — Carter, DeLuca & Farrell LLP; George Likourezos

(57) ABSTRACT

The present disclosure is directed to systems and methods for programmatic digital advertisements that are personalized and uniquely targeted to individually-identified consumers via non-personal, but individually accessed devices. The consumer accessing a non-personal device is identified and data cookie pertaining to the user is created and sent to third-party programmatic advertising exchanges for the use in real time bidding, private marketplace deals, or programmatic guaranteed sales. This allows for personalized digital advertisements to be delivered to a specific user accessing a non-personal device.

12 Claims, 9 Drawing Sheets

Related U.S. Application Data continuation-in-part of application No. 15/722,185, filed on Oct. 2, 2017, now Pat. No. 11,195,208.

(51) Int. Cl.
   *H04L 67/303* (2022.01)
   *H04L 67/306* (2022.01)
   *H04L 67/53* (2022.01)
   *G06Q 30/0241* (2023.01)
   *G06Q 30/0273* (2023.01)
   *H04L 67/131* (2022.01)

(52) U.S. Cl.
   CPC ....... *G06Q 30/0277* (2013.01); *H04L 67/303* (2013.01); *H04L 67/306* (2013.01); *H04L 67/53* (2022.05); *H04L 67/131* (2022.05)

(56) References Cited

U.S. PATENT DOCUMENTS

| | | |
|---|---|---|
| 6,567,842 B2 | 5/2003 | De Leo et al. |
| 6,616,533 B1 * | 9/2003 | Rashkovskiy .......... A63F 13/10 705/14.1 |
| 8,606,630 B2 * | 12/2013 | Fordyce, III ......... G06Q 20/384 705/14.1 |
| 8,751,310 B2 | 6/2014 | van Datta et al. |
| 9,087,428 B1 | 7/2015 | Velline et al. |
| 9,129,301 B2 | 9/2015 | van Datta et al. |
| 9,186,587 B2 * | 11/2015 | Jalili ........................ A63F 9/24 |
| 9,342,835 B2 | 5/2016 | Fordyce, III et al. |
| 11,080,759 B2 | 8/2021 | Wilton et al. |
| 2002/0003162 A1 | 1/2002 | Ferber et al. |
| 2003/0040959 A1 | 2/2003 | Fei et al. |
| 2012/0297416 A1 | 11/2012 | Torrieri et al. |
| 2018/0005483 A1 * | 1/2018 | Washington ........ G07F 17/3246 |

* cited by examiner

SYSTEMS AND METHODS FOR PROGRAMMATIC TARGETED DIGITAL ADVERTISING

CROSS REFERENCE PARAGRAPH

This application is a continuation of U.S. patent application Ser. No. 16/252,283, filed on Jan. 18, 2019, which is a continuation in part of and claims the benefit of and priority to U.S. Non-Provisional patent application Ser. No. 15/722, 185, filed on Oct. 2, 2017, the contents of which are incorporated herein by reference in its entirety.

FIELD OF USE

The present disclosure relates generally to systems and methods for targeted digital advertising. More specifically, the present disclosure relates to programmatic targeted digital advertisements that are personalized and uniquely targeted to individually-identified consumers via non-personal, but individually accessed devices.

BACKGROUND

Programmatic targeted digital advertising has existed for several decades. The advertising has typically been delivered to a unique personal device that is owned or controlled by a user, such as a smartphone, mobile computer, tablet, laptop, and/or desktop computer. The ability to target an advertisement (ad) to a specific user is based on data collected from that unique device, and it is assumed that the owner of that device is the user when the ads are served. The unique user data is typically stored in a cookie, which is a small file on the user's personal device designed to store a modest amount of user information and may be accessible by a Web server. When certain programs or apps that contain advertising are used on the device, specific ads are requested and sent to the program or app based on unique data in that user's cookie.

In a more general and more common process, broader targeted digital advertising is sometimes served on screens in known specific locations, based on broader attributes of audience members that are known to typically be in or near those general locations, such as zip code, city, or county, or based on elements affecting the audience in that location, such as weather, day, date, or time of day.

Currently, programmatic targeted digital advertising is limited to either the specific device of the individual user, or to devices to be viewed by a broad, general audience. As such, in order for advertisements to reach a specific individual user, it must be done via their unique personal device.

Thus, what is needed is system and method that may provide a programmatic digital advertisement to a non-personal device, that is targeted to the specific user currently using the non-personal device.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In accordance with the embodiments disclosed herein, the present disclosure is directed to systems and methods that may programmatically serve specific and uniquely targeted personalized digital advertisements to individually identified consumers on a non-personal, but individually accessed, device. These "non-personal devices" may include electronic gaming machines (EGMs), such as coin operated amusement machines (COAMs), game of skill terminals, and video lottery terminals (VTLs), and the like. As used herein, the term "electronic gaming machines" (EGMs) is meant to include slot machines, COAMs, VLTs, game of skill terminals, and any other non-personal electronic gaming machine. The individual may be identified by the system via a "personal identification device", which may be a gaming players club card (also referred to as a player's card, player's club card, or slot club card), a credit/debit card, merchant services data, or a smartphone app that contains personal data similar to that which is found in a players club card. The specific targeting and personalization may be based on attributes of each individual's unique profile data. The individual's data may reside in pre-existing proprietary databases. The individual will be identified, the data accessed, and a personalized ad is transcoded and served, in real-time, to the specific individual that is currently accessing the non-personal device.

In one embodiment, the targeted user is identified via the personal identification device, the personalized data is sent from the card or app via a server integration to a database that contains attributes and data related to the targeted user. A personal and specifically identifiable interactive session is triggered. Cookie data may then be created, based on a certain number of these attributes that are valuable to programmatic advertisers. At the same time, a unique device identification (ID) may be activated, which serves as identification of the specific non-personal device for when the ad is returned. The cookie data may then be sent through a server to integrated third-party programmatic advertising exchanges for the use in programmatic auctions such as real time bidding (RTB), private marketplace (PMP), or programmatic guaranteed sales. Once the programmatic auction is won on the exchange by an advertiser, the specific corresponding ad file may be delivered to a private media platform, where it is transcoded into streaming video format for delivery over a network to the specific non-personal device, where it is displayed to that specific individual in real-time. This process is repeated for the duration of their use of the non-personal device. A proof-of-play is created when the ad is delivered to the user accessing the non-personal device. The proof-of-play contains information pertaining to the both the individual and the accessed non-personalized device. The proof-of-play serves as proof to the third-party programmatic advertising partners that there is a specific individual accessing the specific non-personalized device when the ad is displayed.

In another embodiment, a targeted user may insert a personal players card into the non-personal device, which may trigger a personally and specifically identifiable interactive session. The individual may be identified, and the targeted user's cookie data may be accessed to create a system data cookie specific to the targeted user. The personalized data may be sent, via a server integration, to third-party programmatic advertising exchanges. The system data cookie allows a unique match on the system between media buyer targets and the targeted user, which may allow a specifically targeted ad to be served to the targeted user. This creates a better value proposition for the programmatic advertiser. If there is an auction, the winner's ad, which is relevant to the targeted user, may be delivered to the non-personal device in real-time. This process may repeat or continue until the targeted user is no longer identified as using the non-personal device (such as by the removal of the players club card). If a different user uses the non-personal device, the ads displayed to that user will be targeted and relevant to that different user.

The system and method of the present disclosure may create a unique system data cookie from certain personal information submitted by the user when obtaining the players club card and submitted during on-game sessions of the non-personal devices. The system data cookie preferably contains certain individual attributes of that user that are formatted to be specifically usable as targeting data to request programmatic advertising from external programmatic advertisement providers. The system requests programmatic targeted advertisements based on the information on the system data cookie. Video streaming technology may be used to transcode the programmatic targeted ad content and then stream that content to the non-personal device that is sessioned with the targeted user. The system schedules, distributes, and directs specific streaming ads to various non-personal devices as user session with the device. The system of the present disclosure allows data transmission and/or communications between the non-personal devices, the platform server, and the external programmatic ad providers.

In another embodiment, the system may create (or obtain) and serve programmatic targeted advertisements to individual consumers (targeted users) on non-personal devices, such as EGMs, in real time. The system of the present disclosure may create the targeted ads using players card (or other personal identification device) information or merchant services data (or that same personal data may be contained within a smartphone app that is on the user's smartphone (a player's club app)). This may allow for real-time user targeting and ad serving on non-personalized devices connected to the server of the system. Once the user's players club card is inserted into an EGM, or a session is activated through a smartphone app or card on a COAM or VLT, the targeted user's interactive session may begin. The unique device ID may be activated and correlated to the specific cookie for identification of the device when the ad is returned. The personalized data from the personal identification device (card or app) may then be sent via a server integration to a data base (on the system server) that contains the attributes for that user. The system server is where the user data "cookie" (system data cookie) may be created. When the user is identified, a certain number of their attributes (all of which are preferably anonymous) that are valuable to programmatic advertisement providers, are attached to the system data cookie for transmission into the programmatic ad system. The individual data cookie may preferably then be sent, by the system server, to integrated third party programmatic advertising exchanges for the use in RTB, PMP, or programmatic guaranteed sales. This data or "advertising cookie" creates a better value proposition for the programmatic advertisement provider, because their bidding profile is based on a matching set of identified consumer attributes. Once the programmatic auction is won on the exchange by an advertiser, the specific corresponding ad file may be delivered to the system server where it is transcoded into streaming video format for delivery over the system. The specific corresponding transcoded ad may be delivered to the non-personal device where the targeted data originated (via the unique device ID), via a system streaming server, and is displayed to that specific player (the targeted user) in real-time. Specific and relevant advertisements will continue to be requested, bid upon, won, transcoded, and served to the identified and targeted user on the screen or display of the non-personal device during the entire length of their on-game session. This process may continue until the card is removed, or the targeted user is no longer identified as using the non-personal device. This will end the active targeted session for that targeted user. The process may repeat for the next player/user to insert their card or otherwise be identified as using the machine.

In another embodiment, the systems and methods may serve general, non-targeted, external ads to the non-personal devices.

Other embodiments may serve internal content to the display of the non-personal device.

Other embodiments may stream content to both personal and non-personal devices.

One embodiment may be a method for providing programmatic targeted digital advertisements to targeted users of non-personal gaming devices via a computing system. The computing system comprises a) a system server operable to control the computing system; b) a firewall security device operatively connected to the system server, wherein the firewall security device is operable to control the transmission of data to and from the system server via an interconnected network; c) a content management server operatively connected to the system server via the interconnected network, wherein the content management system is configured to store a plurality of content data therein, wherein the content management server is configured to exchange content data with at least the system server via the firewall security device; d) a plurality of non-personal gaming devices, wherein each non-personal gaming device is operatively connected to the content management server, wherein each non-personal gaming device is configured to provide limited duration access to a plurality of users thereof; e) a relational database management system server operatively connected to the content management server and the plurality of non-personal gaming devices, wherein the relational database management server is configured to store a plurality of user data associated with users of the non-personal gaming devices; and f) at least one ad exchange, wherein the at least one ad exchange is operatively connected to at least one programmatic ad provider, wherein the at least one ad exchange is operatively connected to the system server via the interconnected network, wherein the at least one ad exchange is configured to communicate a plurality of targeted advertisements received from at least one programmatic ad provider to the system server for transmission thereof to a selected number of the plurality of non-personal gaming devices.

The method comprises initiating at least one limited duration gaming session on a non-personal gaming device by a user, obtaining, by the non-personal gaming device, a plurality of personal user data related to the user, wherein the personal user data comprises data associated with at least one attribute of the user, and transmitting at least a portion of the plurality of personal user data and device identification data for the non-personal gaming device to the relational database management system server. The relational database management system server generates a user profile based on the received personal user data, wherein the user profile includes at least one attribute of the user and transmits the generated user profile and the device identification data associated with the user to the system server. The system server transmits the user profile to at least one programmatic ad provider via the at least one ad exchange for the at least one programmatic ad provider to bid on providing targeted advertisements in response thereto. The at least one ad exchange transmits at least one targeted advertisement from at least one programmatic ad provider to the system server, wherein the at least one targeted advertisement is based on at least a portion of the user profile. The system server transmits the at least one targeted advertisement to the non-personal gaming device in accordance with the device identification data associated with the non-personal gaming device. The at least one targeted advertisement is displayed on an associated display of the non-personal gaming device during the user's limited duration gaming session. In one embodiment, the at least one targeted advertisement is rendered by the non-personal gaming device via an HTML 5 browser for display on thereon.

In one embodiment, upon display of the at least one targeted advertisement, the non-personal gaming device creates proof-of-play data and transmits the proof-of-play data to the content management server. The content management server transmits the proof-of-play data to at least one programmatic ad provider via the system server.

In one embodiment, the at least one attribute is selected from the group consisting of user membership duration, user play history, user behavior, user demographics, and user psychographics.

One embodiment may be a system for providing programmatic targeted digital advertisements to targeted users of non-personal gaming devices. The system comprises a) a system server operable to control the computing system; b) a firewall security device operatively connected to the system server, wherein the firewall security device is operable to control the transmission of data to and from the system server via an interconnected network; c) a content management server operatively connected to the system server via the interconnected network, wherein the content management system is configured to store a plurality of content data therein, wherein the content management server is configured to exchange content data with at least the system server via the firewall security device; d) a plurality of non-personal gaming devices, wherein each non-personal gaming device is operatively connected to the content management server, wherein each non-personal gaming device is configured to provide limited duration access to a plurality of users thereof; e) a relational database management system server operatively connected to the content management server and the plurality of non-personal gaming devices, wherein the relational database management server is configured to store a plurality of user data associated with users of the non-personal gaming devices; and f) at least one ad exchange, wherein the at least one ad exchange is operatively connected to at least one programmatic ad provider, wherein the at least one ad exchange is operatively connected to the system server via the interconnected network, wherein the at least one ad exchange is configured to communicate a plurality of targeted advertisements received from at least one programmatic ad provider to the system server for transmission thereof to a selected number of the plurality of non-personal gaming devices.

Each non-personal gaming device is further operable to initiate at least one limited duration gaming session for an associated user thereon; obtain a plurality of personal user data related to the user, wherein the personal user data comprises data associated with at least one attribute of the user; transmit at least a portion of the plurality of personal user data and device identification data for the non-personal gaming device to the relational database management system server; and display the at least one targeted advertisement on an associated display thereof during the user's limited duration gaming session. The relational database management system server is further operable to generate a user profile based on the received personal user data, wherein the user profile includes at least one attribute of the user; and transmit the generated user profile and the device identification data associated with the user to the system server. The system server is further operable to transmit the user profile to at least one programmatic ad provider via the at least one ad exchange; receive at least one targeted advertisement from at least one programmatic ad provider via the at least one ad exchange, wherein the at least one targeted advertisement is based on at least a portion of the user profile; and transmit the at least one targeted advertisement to the non-personal gaming device in accordance with the device identification data associated with the non-personal gaming device for display thereon. In one embodiment, the non-personal gaming device is further operable to render the at least one targeted ad via an HTML 5 browser for display thereon.

In one embodiment, upon display of the at least one targeted advertisement, the non-personal gaming device is further operable to create proof-of-play data and transmit the proof-of-play data to the content management server. The content management server is further operable to transmit the proof-of-play data to at least one programmatic ad provider via the system server.

In one embodiment, the at least one attribute is selected from the group consisting of user membership duration, user play history, user behavior, user demographics, and user psychographics.

One embodiment may be a method for providing programmatic targeted digital advertisements to targeted users of non-personal gaming devices via a computing system. The computing system comprises a) a system server operable to control the computing system; b) a system streaming server operatively connected to the system server, wherein the system streaming server is operable to transmit streaming video received from the system server via an interconnected network; c) a customer streaming server operatively connected to the system server via the interconnected network, wherein the customer streaming server is operable to receive streaming video from the system streaming server via the interconnected network; d) a plurality of non-personal gaming devices, wherein each non-personal gaming device is operatively connected to the content management server, wherein each non-personal gaming device is configured to provide limited duration access to a plurality of users thereof; e) a relational database management system server operatively connected to the customer streaming server and the plurality of non-personal gaming devices, wherein the relational database management server is configured to store a plurality of user data associated with users of the non-personal gaming devices; and f) at least one ad exchange, wherein the at least one ad exchange is operatively connected to at least one programmatic ad provider, wherein the at least one ad exchange is operatively connected to the system server via the interconnected network, wherein the at least one ad exchange is configured to communicate a plurality of targeted advertisements received from at least one programmatic ad provider to the system server for transmission thereof to a selected number of the plurality of non-personal gaming devices.

The method comprises initiating at least one limited duration gaming session on a non-personal gaming device by a user, obtaining, by the non-personal gaming device, a plurality of personal user data related to the user, wherein the personal user data comprises data associated with at least one attribute of the user, and transmitting at least a portion of the plurality of personal user data and device identification data for the non-personal gaming device to the relational database management system server. The relational database management system server generates a user profile based on the received personal user data, wherein the user profile includes at least one attribute of the user and transmits the generated user profile and the device identification data associated with the user to the system server. The system server transmits the user profile to at least one programmatic ad provider via the at least one ad exchange for the at least one programmatic ad provider to bid on providing targeted advertisements in response thereto. The at least one ad exchange transmits at least one targeted advertisement from at least one programmatic ad provider to the system server, wherein the at least one targeted advertisement is based on at least a portion of the user profile. The system server transcodes the at least one targeted advertisement into streaming video format and transmits the at least one transcoded targeted advertisement to the system streaming server. The system streaming server transmits the at least one transcoded targeted advertisement to the customer streaming server, wherein the customer streaming server transmits the at least one transcoded targeted advertisement to the non-personal gaming device in accordance with the device identification data associated with the non-personal gaming device. The at least one transcoded targeted advertisement is displayed on an associated display of the non-personal gaming device during the user's limited duration gaming session.

In one embodiment, upon display of the at least one transcoded targeted advertisement, the non-personal gaming device creates proof-of-play data and transmits the proof-of-play data to the customer streaming server. The customer streaming server transmits the proof-of-play data to the at least one programmatic ad provider via the system server.

In one embodiment, the at least one attribute is selected from the group consisting of user membership duration, user play history, user behavior, user demographics, and user psychographics.

One embodiment may be a system for providing programmatic targeted digital advertisements to targeted users of non-personal gaming devices. The system comprises a) a system server operable to control the computing system; b) a system streaming server operatively connected to the system server, wherein the system streaming server is operable to transmit streaming video received from the system server via an interconnected network; c) a customer streaming server operatively connected to the system server via the interconnected network, wherein the customer streaming server is operable to receive streaming video from the system streaming server via the interconnected network; d) a plurality of non-personal gaming devices, wherein each non-personal gaming device is operatively connected to the content management server, wherein each non-personal gaming device is configured to provide limited duration access to a plurality of users thereof; e) a relational database management system server operatively connected to the customer streaming server and the plurality of non-personal gaming devices, wherein the relational database management server is configured to store a plurality of user data associated with users of the non-personal gaming devices; and f) at least one ad exchange, wherein the at least one ad exchange is operatively connected to at least one programmatic ad provider, wherein the at least one ad exchange is operatively connected to the system server via the interconnected network, wherein the at least one ad exchange is configured to communicate a plurality of targeted advertisements received from at least one programmatic ad provider to the system server for transmission thereof to a selected number of the plurality of non-personal gaming devices.

Each non-personal gaming device is further operable to initiate at least one limited duration gaming session for an associated user thereon; obtain a plurality of personal user data related to the user, wherein the personal user data comprises data associated with at least one attribute of the user; transmit at least a portion of the plurality of personal user data and device identification data for the non-personal gaming device to the relational database management system server; and display the at least one targeted advertisement on an associated display thereof during the user's limited duration gaming session. The relational database management system server is further operable to generate a user profile based on the received personal user data, wherein the user profile includes at least one attribute of the user; and transmit the generated user profile and the device identification data associated with the user to the system server. The system server is further operable to transmit the user profile to at least one programmatic ad provider via the at least one ad exchange; receive at least one targeted advertisement from at least one programmatic ad provider via the at least one ad exchange, wherein the at least one targeted advertisement is based on at least a portion of the user profile; transcode the at least one targeted advertisement into streaming video content, and transmit the at least one transcoded targeted advertisement to the system streaming server. The system streaming server is further operable to transmit the at least one transcoded targeted advertisement to the customer streaming server. The customer streaming server is further operable to transmit the at least one transcoded targeted advertisement to the non-personal gaming device in accordance with the device identification data associated with the non-personal gaming device for display thereon.

In one embodiment, upon display of the at least one transcoded targeted advertisement, the non-personal gaming device is further operable to create proof-of-play data and transmit the proof-of-play data to the customer streaming server. The customer streaming server is further operable to transmit the proof-of-play data to at least one programmatic ad provider via the system server.

In one embodiment, the at least one attribute is selected from the group consisting of user membership duration, user play history, user behavior, user demographics, and user psychographics.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1:
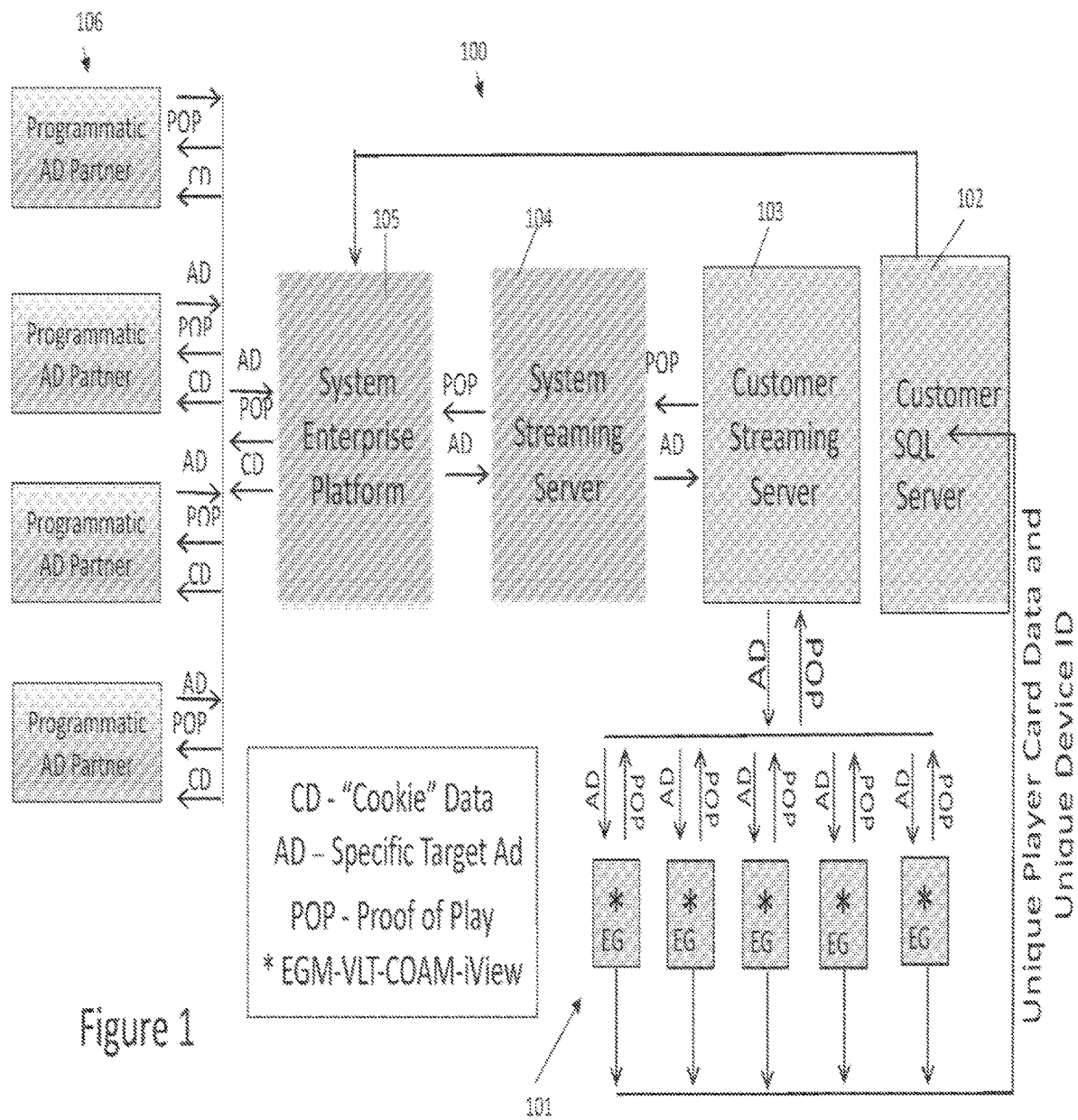
FIG. 1 is a schematic diagram of one embodiment of a system and method for programmatic targeted digital advertising.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present systems may be understood more readily by reference to the following detailed description of preferred embodiments and the examples included therein and to the Figures and their previous and following description.

As will be appreciated by one skilled in the art, the systems and methods may take the form of an entirely hardware embodiment, an entirely software embodiment, or an embodiment combining software and hardware embodiments. Furthermore, the systems and methods may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, compact discs, read-only-memory (CD-ROMs), optical storage devices, or magnetic storage devices.

Embodiments of the systems and methods are described below with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

In accordance with the embodiments disclosed herein, the present disclosure is directed to systems and methods that will programmatically serve specific and uniquely targeted personalized digital advertisements to individually identified consumers via non-personal, but individually accessed devices. These "non-personal devices" may include EGMs.

In one embodiment, the EGM includes at least one processor such as a microprocessor, a microcontroller-based platform, a suitable integrated circuit or one or more application-specific integrated circuits (ASIC's). The processor is in communication with or operable to access or to exchange signals with at least one data storage or memory device. In one embodiment, the processor and the memory device reside within the EGM. The memory device stores program code and instructions, executable by the processor, to control the EGM. The memory device also stores other data such as image data, event data, player input data, random or pseudo-random number generators, pay-table data or information, and applicable game rules that relate to the play of the EGM. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the EGMs disclosed herein.

In one embodiment, part or all of the program code and/or operating data described above may be stored in a detachable or removable memory device, including, but not limited to, a suitable cartridge, disk, CD ROM, DVD, or USB memory device. In other embodiments, part or all of the program code and/or operating data described above may be downloaded to the memory device through a suitable network.

In one or more embodiments, the EGM includes one or more display devices controlled by the processor. The display devices are preferably connected to or mounted on the EGM. The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle. The display devices of the EGM are configured to display at least one and preferably a plurality of game or other suitable images, symbols, and indicia such as any visual representation or exhibition of the movement of objects such as mechanical, virtual, or video reels and wheels, dynamic lighting, video images, images of people, characters, places, things, faces of cards, and the like.

In one embodiment, the EGM includes at least one and preferably a plurality of input devices in communication with the processor. The input devices may include any suitable device which enables the user to interact with the EGM.

The individual may be identified by the system via a "personal identification device", which may be a gaming players club card (also referred to as a player's card, player's club card, or slot club card), a credit/debit card, merchant services data, or a smartphone app that contains personal data similar to that which is found in a players club card. The specific targeting and personalization may be based on attributes of that individual's unique profile data. The individual's data may reside in pre-existing proprietary databases. The individual may be identified, the data accessed, and the personalized ad served, in real-time, to non-personal devices connected to a specific network.

FIG. 1 is a schematic diagram of one embodiment of a system and method for programmatic targeted digital advertising. As shown in FIG. 1, the system 100 may be connected to or may comprise: at least one non-personal device 101; various network connections that connect the system together as shown; a customer relational database management system server 102 (such as the Microsoft® SQL server); a system streaming server 104; a system server 105 (shown as a system enterprise server); at least one programmatic advertisement provider (or partner) 106; and a customer streaming server 103 connected to the non-personal devices 101.

The non-personal devices may comprise EGMs. Communication between the non-personal devices 101 and all servers and programmatic ad partners is suitably made possible with the use of communication protocols, which govern how computers exchange data over a network. The network may be wired, wireless, or a combination of both.

A targeted user may access the non-personal devices 101 by a variety of methods or mechanisms, including, but not limited to, inserting the user's players club card or the user's credit/debit card into the EGM, or otherwise providing a personal identification via merchant services data, a related gaming smartphone app, or other personal identification device. As used herein, the term "players club card", "player's card", "player's club card", or "slot club card" refers to a card provided to a guest of an establishment (such as a casino), wherein the card contains personal data only of the individual guest, such as reward points, credit balance remaining, duration of membership, play history, consumer behaviors, demographics, and psychographics. Credit/debit card data, merchant services data, and data residing in a smartphone app (if used for identification) will preferably contain similar data to that which is on the players club card. The personal data stored on the personal identification device is referred to herein as the "user data".

Once the user accesses the non-personal device 101, the non-personal device 101 may send the user data to the customer relational database management system server 102. The non-personal device 101 may also send a Device ID to the customer relational database management system server 102. The Device ID is an identification tool that is unique to each non-personal device 101. It serves as a guide so that the system server 105 knows to which specific non-personal device 101 the tailored advertisement should be sent. The customer relational database management system server 102 may comprise a database that contains data, specifically including attributes, of all potential targeted users. The customer relational database management system server 102 takes the user data, culling out relevant attributes, and creates a system data cookie by identifying the user and determining which of the user's attributes are relevant for transmission to the programmatic ad providers 106. Relevant attributes may include, but are not limited to, demographics, psychographics, and consumer behavior. The cookie data allows a unique match on the programmatic platform between the media buyer targets and the unique user attributes and creates a better value proposition for the programmatic advertisement provider, because their bidding profile is based on a matching set of identified user attributes. Psychographics, as used herein, means the quantitative methodology used to describe consumers on psychological attributes. Psychographics includes the study of personality, values, activities, opinions, attitudes, interests, and lifestyles.

FIG. 1 shows that the customer relational database management system server 102 transmits the system data cookie and Device ID to the system server 105. The system server 105 provides the system data cookie to the programmatic ad partner 106 via the integrated third-party programmatic advertising exchanges for the use in real time bidding, private marketplace, or programmatic guaranteed sales. A method of real time bidding, indicative of similar methods for private marketplace and programmatic guaranteed sales, may comprise putting up an ad for auction on an exchange, advertisers bidding on it, and the ad being delivered to the system server 105 in fractions of a second.

Once the programmatic auction is won on the exchange by an advertisement provider/partner, the specific corresponding ad file may be delivered to the system server 105, where it is transcoded into streaming video format for delivery to the targeted user. The specific corresponding transcoded ad is delivered to the system streaming server 104, which transmits the ad to the customer streaming server 103, which then delivers the ad, via reference to the Device ID, to the specific non-personal device 101 accessed by the user to which the system data cookie pertains.

The ad is displayed to the targeted user in real-time. The displayed ad will preferably not affect nor change the user experience while accessing the non-personal device 101. Various other (or same) specific and relevant advertisements will continue to be requested, bid upon, won, transcoded, and served to the identified and targeted user on the non-personal device 101 during the entire length of the on-game session. This process will continue until the card is removed or the user otherwise withdraws from being identified by the non-personal device. This will end the active targeted session for that user. The process may repeat for any other user who accesses a non-personal device and is identified via the personal identification device.

The system 100 as set forth in FIG. 1 is primarily for use with more basic or simple versions of EGMS, which may have limited computing functionality, storage capacity, and/or communication capability. For example, the system and method of the present disclosure may be implemented in a casino having older versions of EGMs that do not have the functionality or storage capacity to display the targeted ads in the format received from the programmatic ad partner 106. As such, the targeted ad must be transcoded into a suitable format by the system server 105 and then is delivered to the system streaming server 104, which transmits the ad to the customer streaming server 103, which then delivers the ad to the specific EGM 101. As another example, the system and method may be implemented on EGMs 101 that do not have the computing functionality or communication capability to exchange data directly with the system server 105 and must communicate through the customer streaming server 103. As used herein, the term "basic EGM" will refer to such basic and/or older versions of EGMs.

FIG. 1 shows that the non-personal device 101 provides a proof-of-play ("POP") to the customer stream server 103 upon delivery and display of the ad. The POP serves as proof to the programmatic ad partner 106 that a single non-personal device 101 has been accessed by the single user that the user data relates to, and that the tailored ad has been delivered to that single user. This proof is important because it provides the programmatic ad partner 106 with confirmation that the intended user of the ad was accessing the non-personal device 101 in real-time at the time of delivery of the ad. The customer streaming server 103 sends the POP through the system streaming server 104 and the system server 105 to the programmatic ad partner 106 who won the auction.

This proof is important because it provides the programmatic ad partner 106 with confirmation that the intended user of the ad was accessing the non-personal device 101 in real-time at the time of delivery of the ad. The customer streaming server 103 sends the POP through the system streaming server 104 and the system server 105 to the programmatic ad partner 106 who won the auction.

Figure 2:
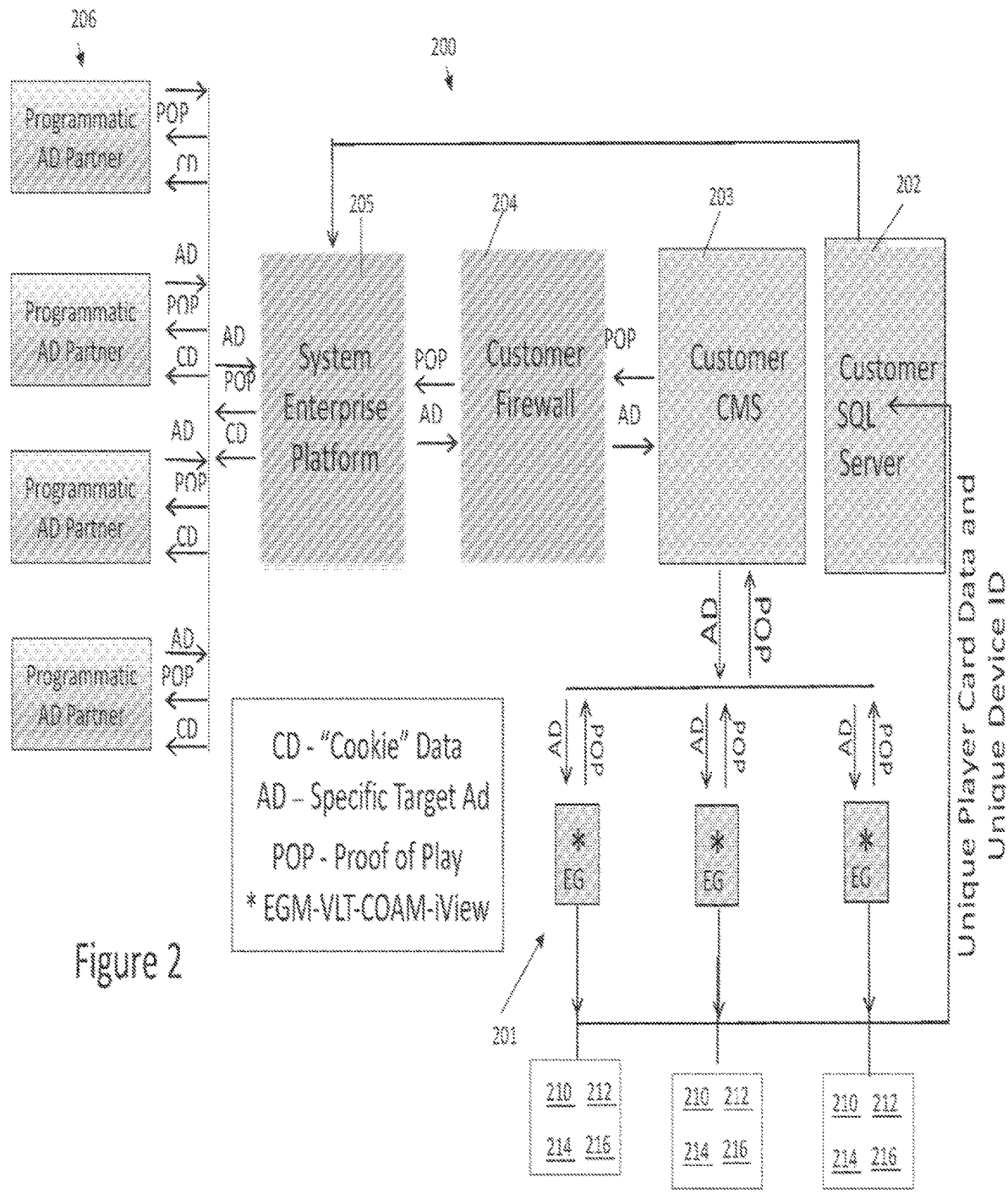
FIG. 2 is a schematic diagram of another embodiment of a system and method for programmatic targeted digital advertising.

FIG. 2 is a schematic diagram of another embodiment of a system and method for providing programmatic targeted digital advertising. This embodiment provides for the provision of programmatic targeted digital advertising to connected electronic display devices or EGMSs having advanced and capable hardware/software functionality. As shown in FIG. 2, the system 200 may be connected to or may comprise: at least one EGM 201; various network connections that connect the system together as shown; a customer relational database management system server 202 (such as the Microsoft® SQL server); a customer firewall 204; a system server 205 (shown as a system enterprise server); at least one programmatic advertisement provider (or partner) 206; and a customer content management system 203 connected to the EGMs 201.

The EGMs 201 may include advanced computing functionality and/or increased storage capacity to display the targeted ads in the format received from the programmatic ad partner 206. The EGMs 201 may also include the computing functionality and/or communication capability to exchange data directly with the system server 205 to receive the targeted ads directly therefrom. As used herein, the term "advanced EGM" will refer to these more advanced EGMs.

In one embodiment, the EGM 201 includes a gaming controller 210 that is coupled to at least one gaming display 212, at least one user input device 214, and memory 216. The gaming controller 210 receives and transmits information to and from the customer relational database management system server 202 and/or the customer content management system 203 and displays the graphical interfaces on the gaming display 212 to enable the user to interact therewith in accordance with the embodiments described herein. The gaming display 212 includes, without limitation, a flat panel display, such as a cathode ray tube display (CRT), a liquid crystal display (LCD), a light-emitting diode display (LED), active-matrix organic light-emitting diode (AMOLED), a plasma display, and/or any suitable visual output device capable of displaying graphical data and/or text to a user. The at least one gaming display 212 may include a user/player data screen, a game screen, and/or a topper screen. Moreover, the user input device 214 includes, without limitation, a keyboard, a keypad, a touch-sensitive screen, a scroll wheel, a pointing device, a barcode reader, a magnetic card reader, a radio frequency identification (RFID) card reader, an audio input device employing speech-recognition software, and/or any suitable device that enables a user to input data into the gaming controller 210 and/or to retrieve data from the gaming controller 210. Alternatively, a single component, such as a touch screen, a capacitive touch screen, and/or a touchless screen, may function as both the gaming display 212 and as the user input device 214.

The memory 216 stores program code and instructions, executable by the gaming controller 210, to control the EGM 201. The memory 216 also stores other data such as image data, event data, player input data, random or pseudo-random number generators, pay-table data or information, and applicable game rules that relate to the play of the EGM 201. In one embodiment, the memory 216 includes random access memory (RAM), which may include non-volatile RAM (NVRAM), magnetic RAM (MRAM), ferroelectric RAM (FeRAM), and other forms as commonly understood in the gaming industry. In one embodiment, the memory 216 includes read only memory (ROM). In one embodiment, the memory 216 includes flash memory and/or EEPROM (electrically erasable programmable read only memory). Any other suitable magnetic, optical, and/or semiconductor memory may operate in conjunction with the EGMs disclosed herein.

In one embodiment, part, or all of the program code and/or operating data described above may be stored in a detachable or removable memory 216, including, but not limited to, a suitable cartridge, disk, CD ROM, DVD, or USB memory device. In other embodiments, part, or all of the program code and/or operating data described above may be downloaded to the memory 216 through a suitable network.

Communication between the EGMs 201 and all servers and programmatic ad partners is suitably made possible with the use of communication protocols, which govern how computers exchange data over a network. The network may be wired, wireless, or a combination of both.

A targeted user may access the EGM 201 by a variety of methods or mechanisms, including, but not limited to, inserting the user's players club card or the user's credit/debit card into the EGM, or otherwise providing a personal identification via merchant services data, a related gaming smartphone app, or other personal identification device.

Once the user accesses the EGM 201, the EGM 201 may send the user data to the customer relational database management system server 202. The EGM 201 may also send a Device ID to the customer relational database management system server 202. The Device ID is an identification tool that is unique to each EGM 201. It serves as a guide so that the system server 205 knows to which specific EGM 201 the tailored advertisement should be sent.

The customer relational database management system server 202 may comprise a database that contains data, specifically including attributes, of all potential targeted users. The customer relational database management system server 202 may suitably be located on-premises, off-premises, or both. The customer relational database management server may also include a third-party identity link solution server. The customer relational database management system server 202 takes the user data, culling out relevant attributes, and creates a system data cookie by identifying the user and determining which of the user's attributes are relevant for transmission to the programmatic ad providers 206. Relevant attributes may include, but are not limited to, demographics, psychographics, and consumer behavior. The cookie data allows a unique match on the programmatic platform between the media buyer targets and the unique user attributes and creates a better value proposition for the programmatic advertisement provider, because their bidding profile is based on a matching set of identified user attributes.

FIG. 2 shows that the customer relational database management system server 202 transmits the system data cookie and Device ID to the system server 205. In another embodiment, the EGM 201 may send the user data directly to the system server 205 via the customer firewall 204. The EGM 201 may also send the Device ID directly to the system server 205 via the customer firewall 204. The system server 205 provides the system data cookie to the programmatic ad partner 206 via the integrated third-party programmatic advertising exchanges for the use in real time bidding, private marketplace, or programmatic guaranteed sales.

Once the programmatic auction is won on the exchange by an advertisement provider/partner, the specific corresponding ad file may be delivered to the system server. The specific ad is delivered through the customer firewall 204, via reference to the Device ID, to the specific EGM 201 accessed by the user to which the system data cookie pertains.

The ad is displayed via the at least one gaming display 212 to the targeted user in real-time. The displayed ad may be displayed on at least one of a user/player data screen, a game screen, a topper screen, and combinations thereof. In one embodiment, the ad may be displayed on a single EGM or on multiple EGMs.

The displayed ad will preferably not affect nor change the user experience while accessing the EGM 201. Various other (or same) specific and relevant advertisements will continue to be requested, bid upon, won, and served to the identified and targeted user on the EGM 201 during the entire length of the on-game session. This process will continue until the card is removed or the user otherwise withdraws from being identified by the EGM 201. This will end the active targeted session for that user. The process may repeat for any other user who accesses an EGM 201 and is identified via the personal identification device.

FIG. 2 also illustrates that the EGM 201 provides a proof-of-play ("POP") to the customer content management system 203 upon delivery and display of the ad. The POP serves as proof to the programmatic ad partner 206 that a single EGM 201 has been accessed by the single user that the user data relates to, and that the tailored ad has been delivered to that single user. The customer content management system 203 sends the POP through the customer firewall 204 and the system server 205 to the programmatic ad partner 206 who won the auction.

As shown in FIGS. 1 and 2, the system of the present disclosure allows for programmatic targeted advertisements to be displayed on EGMs, which before the present disclosure, has not previously been done. The system of the present disclosure is a complete end-to-end solution that processes specific user data, creates a usable cookie data, requests and pulls programmatic content based on the cookie data, and distributes the ad into streaming content, returns proof of play, and assembles metrics and analytics pertaining to the delivered ad. FIGS. 1 and 2 show that the system may schedule, distribute, and direct the specific streaming ads to the correct individual non-personal devices regardless as to how many non-personal machines are connected to the system.

Figure 3:
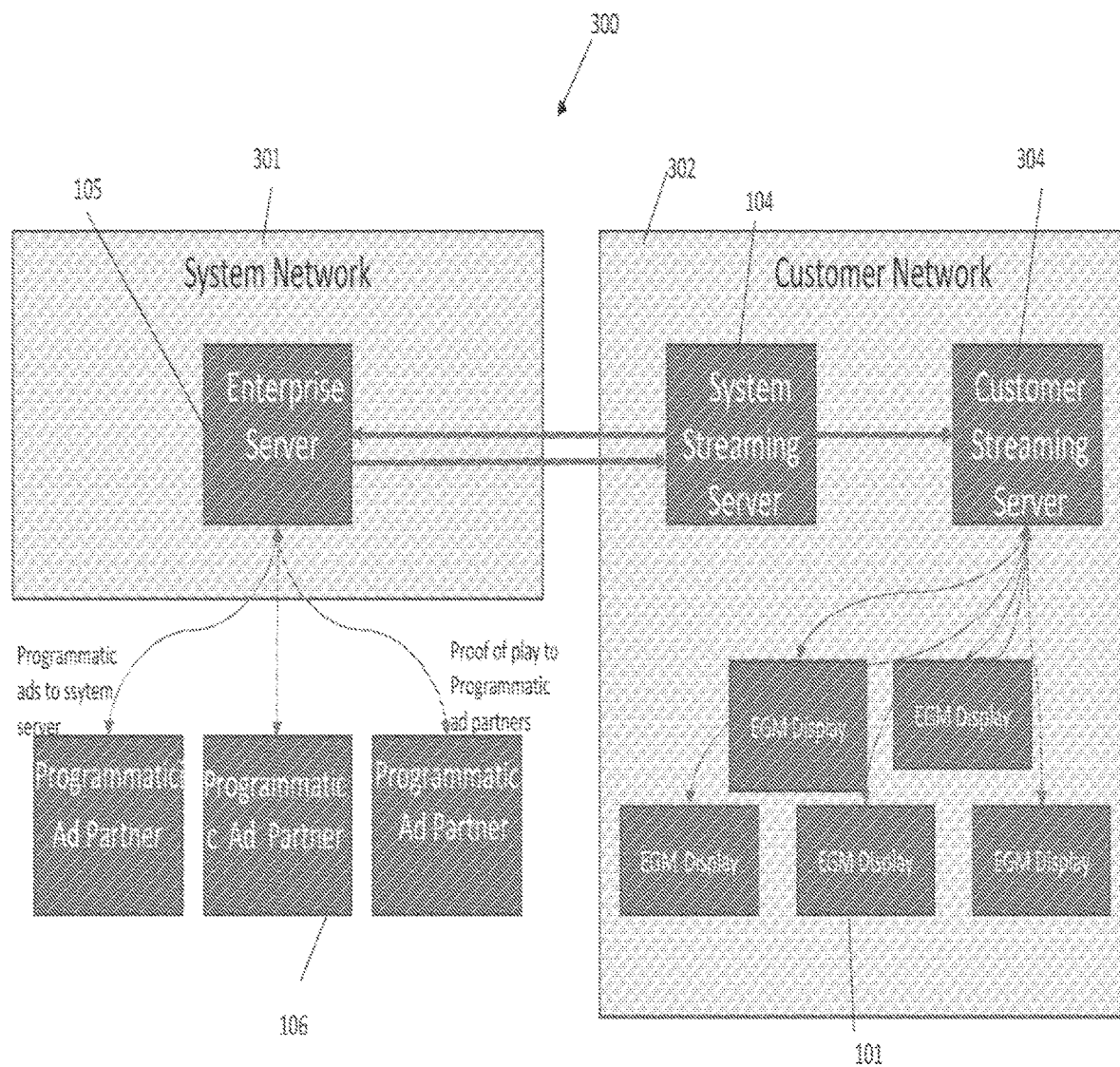
FIG. 3 is a block diagram of one embodiment of a system and method for programmatic targeted digital advertising.

FIG. 3 is a block diagram of one embodiment of a system and method for programmatic targeted digital advertising. FIG. 3 shows an example of the programmatic targeted digital advertisement system 300 for a casino. As shown in FIG. 3, the system network 301 may comprise the system server 105. The customer (or the owner of the non-personal devices) network 302 may comprise the system streaming server 104, the customer streaming server 103 and one or more electronic gaming machines (EGMs) 101 (which are the non-personal devices). The customer network 202, as shown and preferred, may be in communication with the system network 201, wherein the programmatic ad partner 106 may provide a programmatic ad to the system server 105. The system server 105 may send the ad to the system streaming server 104, which sends the ad to the customer streaming server 103, which then delivers the ad to the EGM 101 identified by the Device ID. The EGM 101 may display the ad in real-time to the targeted user that is accessing the EGM 101. A POP is provided to the programmatic ad partner 106 responsible for providing the ad, traveling through the customer streaming server 103, the system streaming server 104, and the system server 105.

Figure 4:
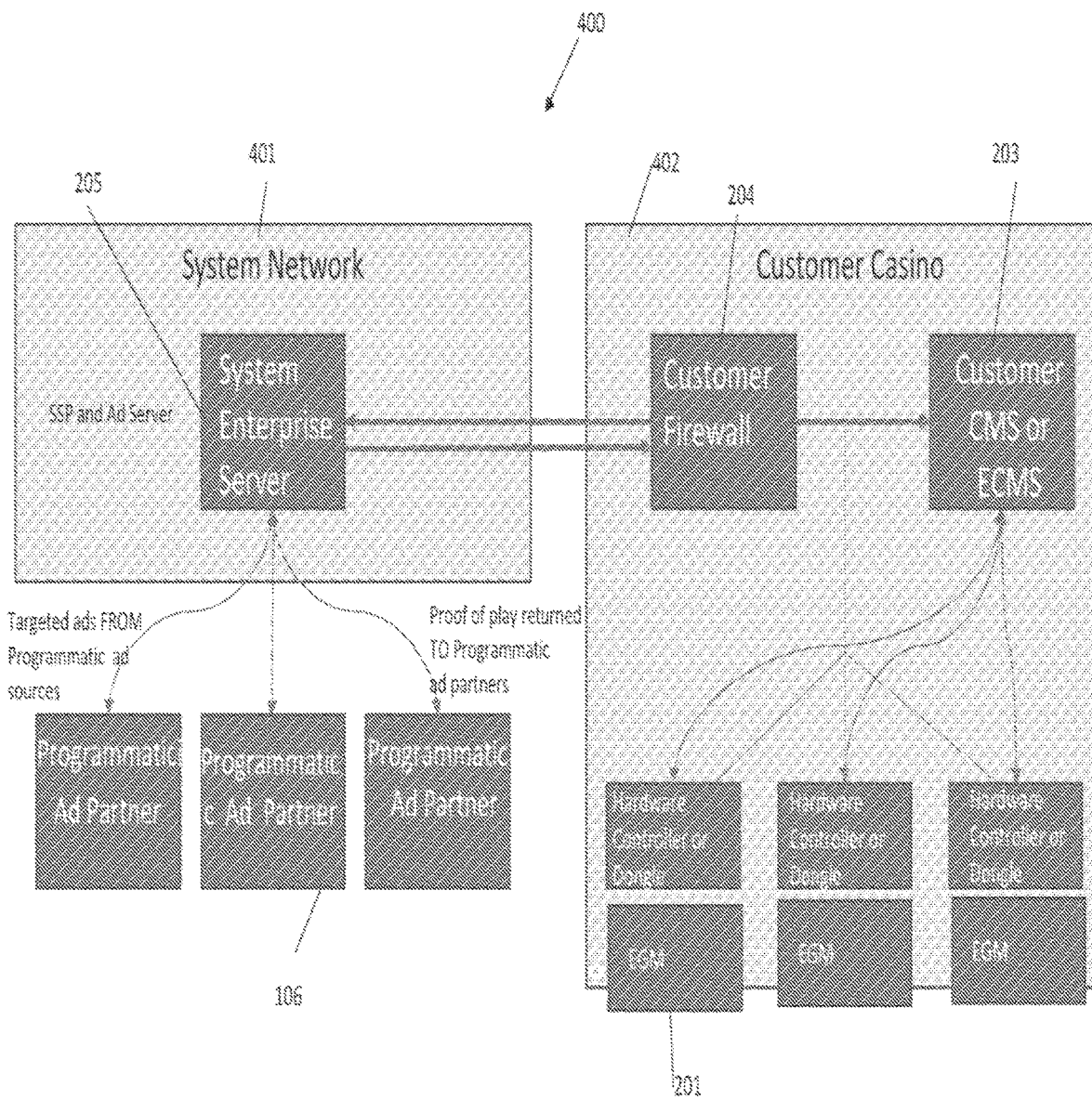
FIG. 4 is a block diagram of another embodiment of a system and method for programmatic targeted digital advertising.

FIG. 4 is a block diagram of another embodiment of a system and method for programmatic targeted digital advertising. FIG. 4 shows an example of the programmatic targeted digital advertisement system 400 for a casino. As shown in FIG. 4, the system network 401 may comprise the system server 205. The customer (or the owner of the non-personal devices) network 402 may comprise the customer firewall 204, the customer content management system 203 and one or more EGMs 201. The customer network 402, as shown and preferred, may be in communication with the system network 401, wherein the programmatic ad partner 206 may provide a programmatic ad to the system server 205. The system server 205 may send the ad via the customer firewall 204 to the customer content management system 203, which then delivers the ad to the EGM 201 identified by the Device ID. In one embodiment, the system server 205 may send the ad via the customer firewall 204 directly to the EGM 201. The EGM 201 may display the ad in real-time to the targeted user that is accessing the EGM 201. A POP is provided to the programmatic ad partner 206 responsible for providing the ad, traveling through the customer content management server 203, the customer firewall 204, and the system server 205. In one embodiment, a POP is provided to the programmatic ad partner 206 directly from the EGM 201 via the customer firewall 204.

Figure 5:
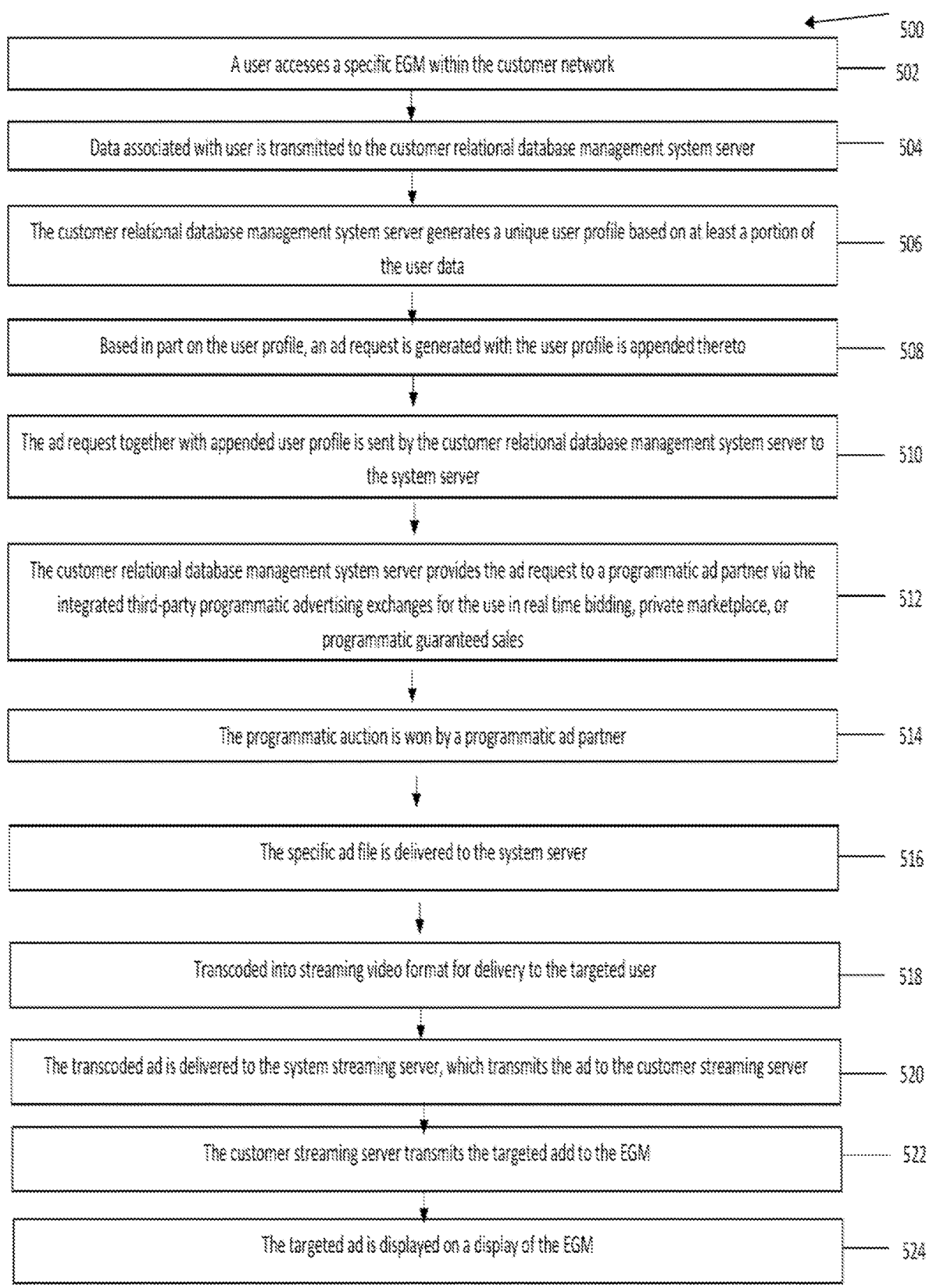
FIG. 5 is a block diagram of one embodiment of how the advertisers, owners of the non-personal devices, and the system of the present disclosure interrelate.

FIG. 5 is a block diagram of one embodiment illustrating a method 500 for collecting user data and providing of programmatic targeted advertising to basic EGMs. As shown in FIG. 5, at 502, a user accesses a specific EGM 101 within the customer network 302. At 504, data associated with user is transmitted to the customer relational database management system server 102. The user data may include, but is not limited to, user identification data, user demographic data, user psychographic data, user consumer behavior data, and the like. In one embodiment, the Device Id of the EGM 101 may also be transmitted to the customer relational database management server 102.

At 506, the customer relational database management system server 102 generates a unique user profile based on at least a portion of the user data. At 508, based in part on the user profile, an ad request is generated with the user profile is appended thereto. At 510, the ad request together with appended user profile is sent by the customer relational database management system server 102 to the system server 105. At 512, the customer relational database management system server 102 provides the ad request to a programmatic ad partner 106 via the integrated third-party programmatic advertising exchanges for the use in real time bidding, private marketplace, or programmatic guaranteed sales.

The programmatic auction is won by a programmatic ad partner 106 as shown at 514. At 516, the specific ad file is delivered to the system server 105 and transcoded into streaming video format for delivery to the targeted user as shown at 518. At 520, the transcoded ad is delivered to the system streaming server 104, which transmits the ad to the customer streaming server 103 as shown at 522. At 524, the customer streaming server 103 transmits the targeted add to the EGM 101 accessed by the user. At 526, the targeted ad is displayed on a display of the EGM 101. In a preferred embodiment, the targeted ad is displayed on a player screen of the EGM.

Figure 6:
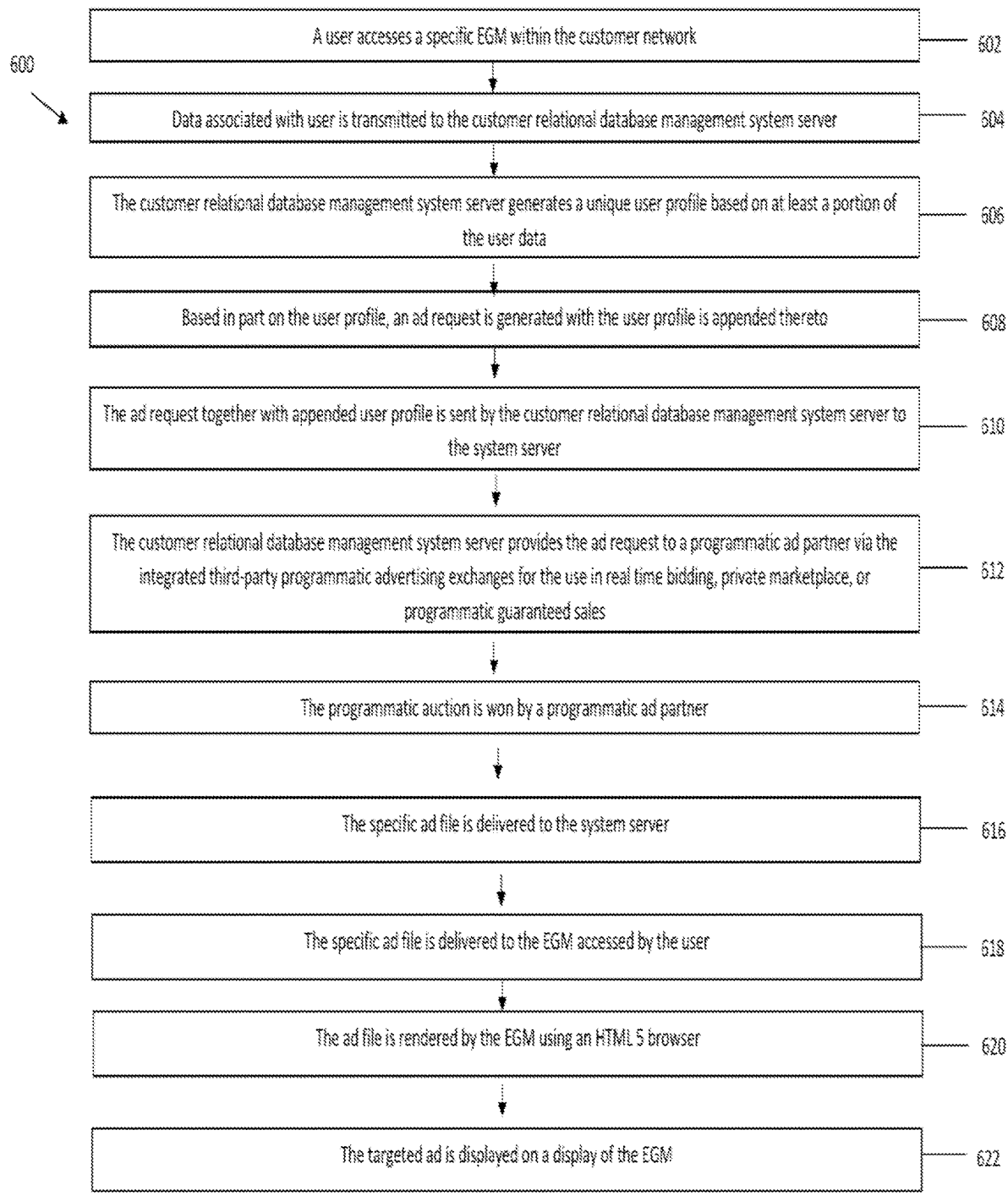
FIG. 6 is a block diagram of one embodiment gaming environment of one embodiment of a system and method for programmatic targeted digital advertising.

FIG. 6 is a block diagram of one embodiment illustrating a method 600 for collecting user data and providing of programmatic targeted advertising to advanced EGMs. As shown in FIG. 6, at 602, a user accesses a specific EGM 201 within the customer network 402. At 604, data associated with user is transmitted to the customer relational database management system server 202. The user data may include, but is not limited to, user identification data, user demographic data, user psychographic data, user consumer behavior data, and the like. In one embodiment, the Device Id of the EGM 201 may also be transmitted to the customer relational database management server 202.

At 606, the customer relational database management system server 202 generates a unique user profile based on at least a portion of the user data. At 608, based in part on the user profile, an ad request is generated with the user profile is appended thereto. At 610, the ad request together with appended user profile is sent by the customer relational database management system server 202 to the system server 205. At 612, the customer relational database management system server 202 provides the ad request to a programmatic ad partner 606 via the integrated third-party programmatic advertising exchanges for the use in real time bidding, private marketplace, or programmatic guaranteed sales.

The programmatic auction is won by a programmatic ad partner 206 as shown at 614. At 616, the specific ad file is delivered to the system server 205. At 618, the specific ad file is delivered to the EGM 201 accessed by the user. At 620, the specific ad file is rendered via an HTML 5 browser. At 622, the targeted ad is displayed on a display of the EGM 201. In a preferred embodiment, the targeted ad is displayed on at least one of a player screen, a game screen, a topper screen, and an HTML 5 browser window of the EGM.

Figure 7:
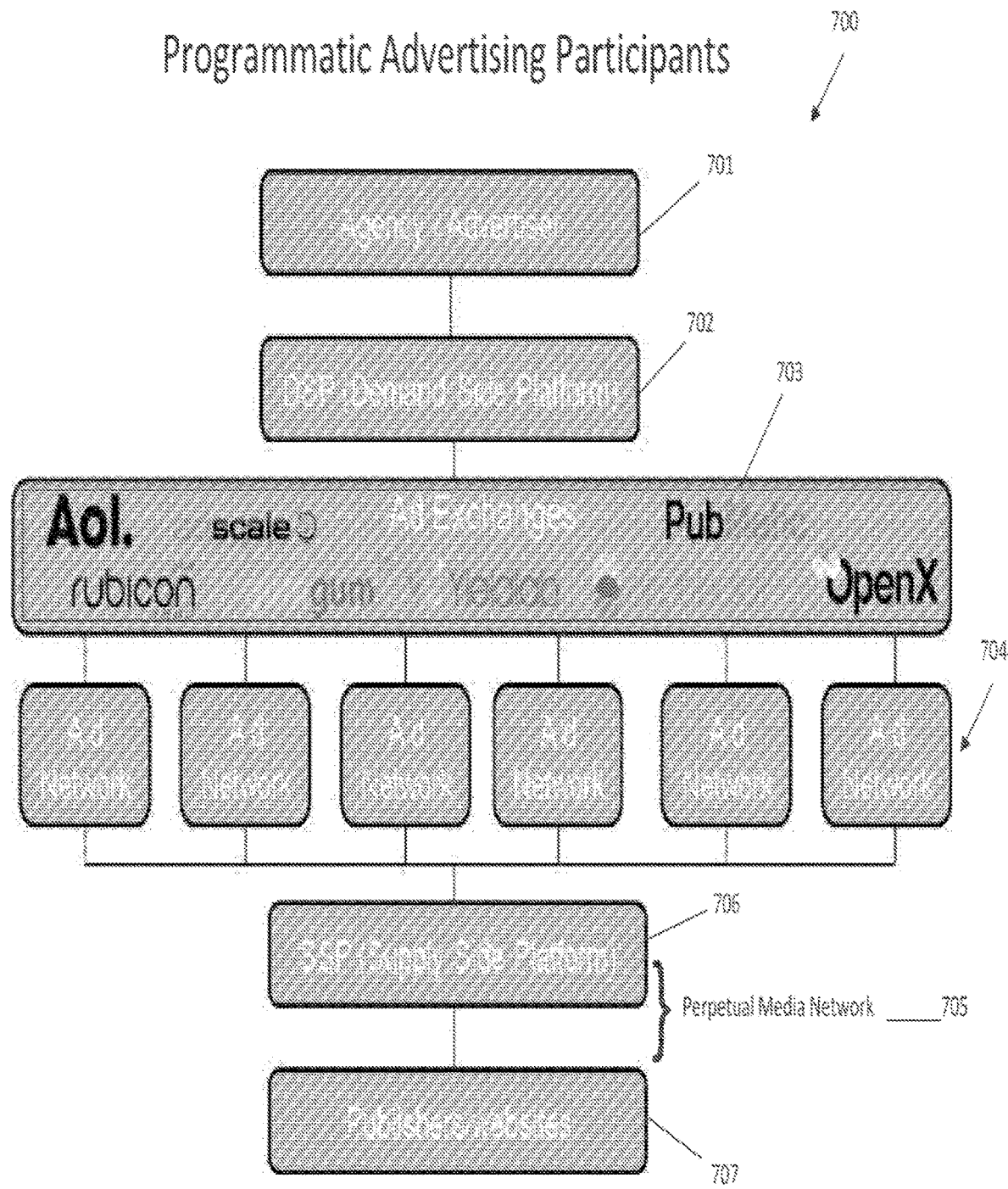
FIG. 7 is an illustration of one embodiment of the system and method for programmatic targeted digital advertising and shows that multiple targeted advertisements may be continually delivered to the non-personal device during the targeted user's session.

FIG. 7 is a block diagram of one embodiment of how the advertisers, owners of the non-personal devices, and the system of the present disclosure interrelate. As shown in FIG. 7, the system 700 may comprise the targeted digital programmatic advertisement providers 701, which are part of the demand side platform 702, various ad exchanges 703, which may include, but are not limited to, AoI®, Rubicon®, Adscale®, GumGum®, Yieldlab®, PubMatic®, DoubleClick®, and OpenX®. In another embodiment, the ad exchange may be entirely provided by the system. FIG. 7 also shows that the system may comprise non-personal device owners 704, which are also referred to as Ad Network providers, such as convenience stores and casinos. The system may also comprise the supply side platform 706, which may comprise the system server and the streaming servers. The supply side platform 706 may also comprise the publisher/website 707, which may comprise the EGMs.

Figure 8:
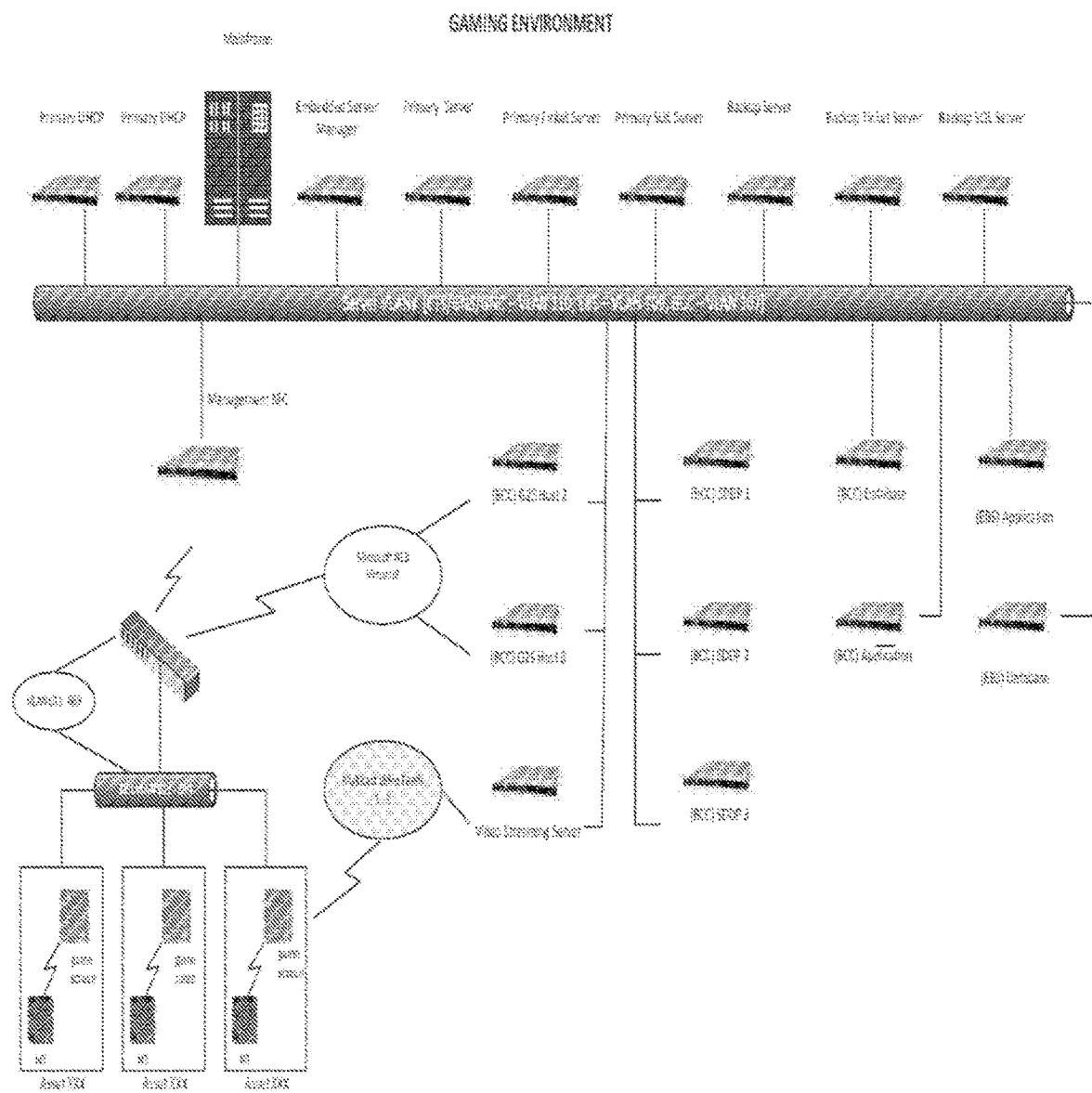
FIG. 8 is a block diagram of another embodiment gaming environment of one embodiment of a system and method for programmatic targeted digital advertising.

FIG. 8 is a block diagram of one embodiment gaming environment of one embodiment of a system and method for programmatic targeted digital advertising. As shown in FIG. 8, the gaming environment may comprise various servers and applications to deliver the programmatic targeted ad to the correct user at the correct non-personal device.

Figure 9:
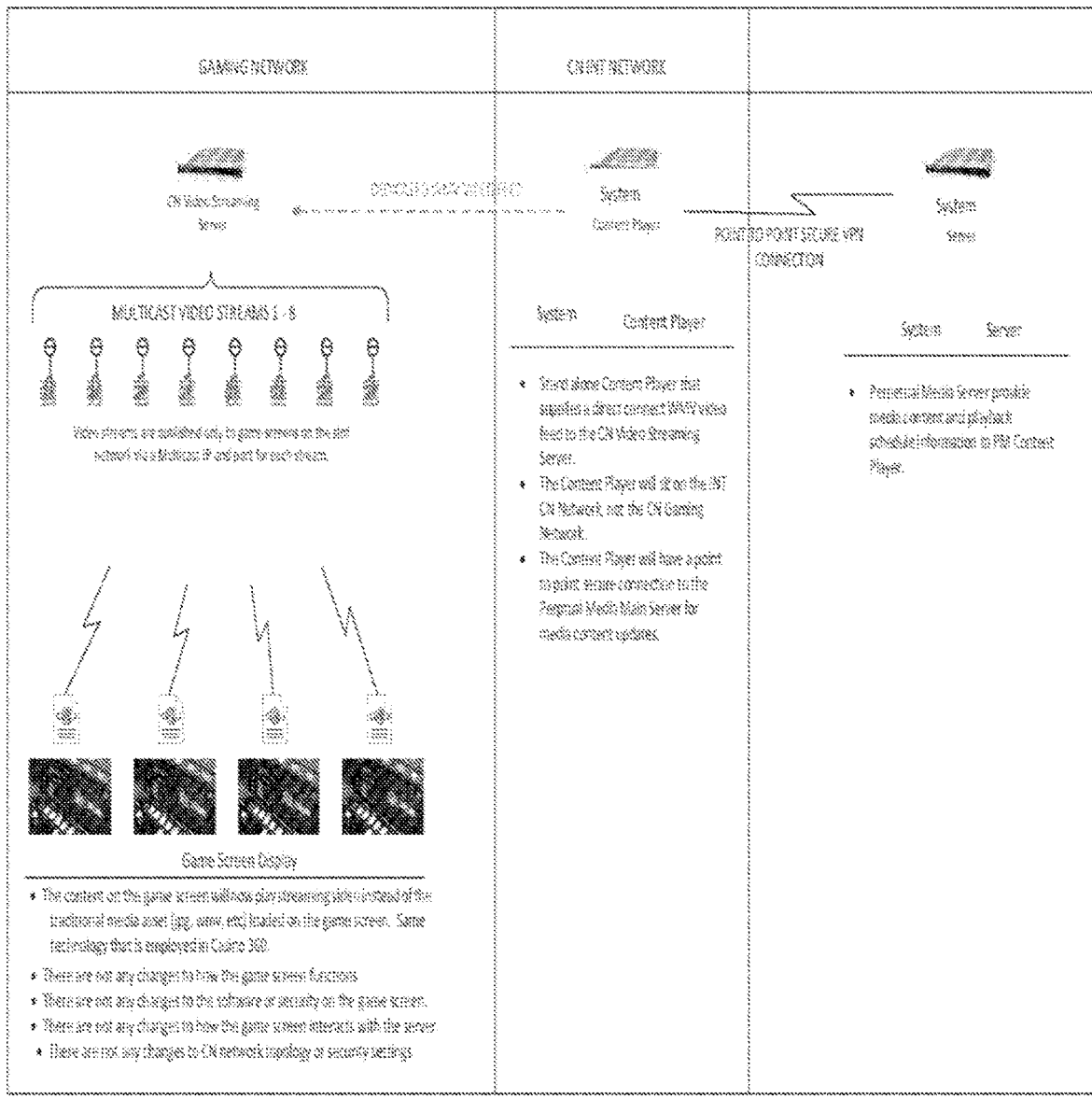
FIG. 9 is an illustration of another embodiment of the system and method for programmatic targeted digital advertising.

FIG. 9 is an illustration of one embodiment of the system and method for programmatic targeted digital advertising and shows that multiple targeted advertisements may be continually delivered to the non-personal device during the targeted user's session. As shown in FIG. 9, the system may further comprise a content player, which is connected to the system server via a point to point secure virtual private network. The system server may provide media content and playback schedule information to the content player. The content player may be a standalone content player that supplies a direct connect WMV video feed to a customer's video streaming server. The content player may preferably reside on the internal customer network and not on the customer gaming network. The content player may provide video streams that are published to displays that may have on-device messaging systems. In this manner, these machines will play the system video stream instead of the traditional media asset.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented method for providing programmatic targeted digital advertisements to targeted users of non-personal gaming devices via a computing system, the method comprising:

initiating at least one limited duration gaming session on a non-personal gaming device by a user, wherein each non-personal gaming device comprises:

a gaming controller operable for controlling the non-personal gaming device;

a gaming display configured for displaying data thereon, including displaying at least one targeted advertisement thereon;

a user input device configured to receive user input; and memory configured to store data therein;

obtaining, by the non-personal gaming device, a plurality of personal user data associated with an attribute of the user;

transmitting at least a portion of the plurality of personal user data and a device ID for the specific non-personal gaming device accessed by the user to a relational database management system server;

generating, by the relational database management system server, a user profile based on the transmitted portion of the plurality of personal user data, wherein the user profile includes an attribute of the user;

transmitting, by the relational database management system server, the generated user profile and the device ID associated with the user to the system server;

transmitting, by a system server, the user profile to a programmatic ad provider via at least one ad exchange, wherein the at least one ad exchange is operatively connected to the programmatic ad provider, wherein the at least one ad exchange is operatively connected to the system server via an interconnected network, wherein the at least one ad exchange is configured to communicate a plurality of targeted advertisements received from the programmatic ad provider to the system server for transmission thereof to a selected number of a plurality of non-personal gaming devices, wherein each non-personal gaming device is configured to provide limited duration access to a plurality of users thereof, and wherein the plurality of non-personal gaming devices each include a unique device ID;

transmitting, by the at least one ad exchange, at least one targeted advertisement from the programmatic ad provider to the system server, wherein the at least one targeted advertisement is based on at least a portion of the user profile;

determining, by the system server, which of the plurality of non-personal gaming devices to transmit the at least one targeted advertisement based on the device ID associated with the specific non-personal gaming device;

transmitting, by the system server, the at least one targeted advertisement to the specific non-personal gaming device based on the determined device ID;

rendering, by the gaming controller, the at least one targeted advertisement via a web-enabled video player for display on one or more second hardware screens;

bidding, by a programmatic ad partner to provide at least one targeted advertisement based on the user profile; and displaying the at least one targeted advertisement on an associated display of the determined specific non-personal gaming device during the user's limited duration gaming session and when the gaming session is paused, wherein the associated display includes the one or more second hardware screens.

2. The method of claim 1, further comprising:

upon display of the at least one targeted advertisement, creating, by the non-personal gaming device, proof-of-play data;

transmitting the proof-of-play data to a content management server; and transmitting, by the content management server, the proof-of-play data to the programmatic ad provider via the system server.

3. The method of claim 1, wherein at least a portion of the personal user data is received from the user via the user input device.

4. The method of claim 1, wherein the at least one attribute is selected from the group consisting of user membership duration, user play history, user behavior, user demographics, and user psychographics.

5. A computer-implemented method for providing programmatic targeted digital advertisements to targeted users of non-personal gaming devices via a computing system, the computing system comprising:

a system server operable to control the computing system;

a firewall security device operatively connected to the system server, wherein the firewall security device is operable to control the transmission of data to and from the system server via an interconnected network;

a content management server operatively connected to the system server via the interconnected network, wherein the content management server is configured to store a plurality of content data therein, wherein the content management server is configured to exchange content data with at least the system server via the firewall security device;

a plurality of non-personal gaming devices, wherein each non-personal gaming device is operatively connected to the content management server, wherein each non-personal gaming device is configured to provide limited duration access to a plurality of users thereof, and wherein the plurality of non-personal gaming devices each include a unique device ID;

a relational database management system server configured to generate a user profile based on received personal user data, operatively connected to the content management server and the plurality of non-personal gaming devices, wherein the relational database management server is configured to store a plurality of user data associated with users of the non-personal gaming devices;

at least one ad exchange, wherein the at least one ad exchange is operatively connected to at least one programmatic ad provider, wherein the at least one ad exchange is operatively connected to the system server via the interconnected network, wherein the at least one ad exchange is configured to communicate a plurality of targeted advertisements received from at least one programmatic ad provider to the system server for transmission thereof to a selected number of the plurality of non-personal gaming devices;

wherein each non-personal gaming device comprises:
- a gaming controller operable for controlling the non-personal gaming device;
- a gaming display configured for displaying data thereon, including displaying the at least one targeted advertisement thereon;
- a user input device configured to receive user input; and
- memory configured to store data therein;

the method comprising:
- initiating at least one limited duration gaming session on a non-personal gaming device by a user;
- obtaining, by the non-personal gaming device, a plurality of personal user data related to the user, wherein the personal user data comprises data associated with at least one attribute of the user;
- transmitting at least a portion of the plurality of personal user data and a device ID for the specific non-personal gaming device accessed by the user to the relational database management system server;
- generating, by the relational database management system server, a user profile based on the received personal user data, wherein the user profile includes at least one attribute of the user;
- transmitting, by the relational database management system server, the generated user profile and the device ID associated with the user to the system server;
- transmitting, by the system server, the user profile to at least one programmatic ad provider via the at least one ad exchange;
- transmitting, by the at least one ad exchange, at least one targeted advertisement from at least one programmatic ad provider to the system server, wherein the at least one targeted advertisement is based on at least a portion of the user profile;
- determining, by the system server, which of the plurality of non-personal gaming devices to transmit the at least one targeted advertisement based on the device ID associated with the specific non-personal gaming device;
- transmitting, by the system server, the at least one targeted advertisement to the specific non-personal gaming device based on the determined device ID;
- rendering, by the gaming controller, the at least one targeted advertisement via a web-enabled video player for display on the gaming display;
- bidding, by a programmatic ad partner to provide at least one targeted advertisement based on the user profile; and
- displaying the at least one targeted advertisement on an associated display of the determined specific non-personal gaming device during the user's limited duration gaming session and during when the gaming session is paused, wherein the associated display includes one or more second hardware screens.

6. The computer-implemented method of claim 5, further comprising:
- upon display of the at least one targeted advertisement, creating, by the non-personal gaming device, proof-of-play data;
- transmitting the proof-of-play data to the content management server; and
- transmitting, by the content management server, the proof-of-play data to at least one programmatic ad provider via the system server.

7. The computer-implemented method of claim 5, wherein at least a portion of the personal user data is received from the user via the user input device.

8. The computer-implemented method of claim 5, wherein the at least one attribute is selected from the group consisting of user membership duration, user play history, user behavior, user demographics, and user psychographics.

9. A system for providing programmatic targeted digital advertisements to targeted users of non-personal gaming devices, the system comprising:
- a system server operable to control the system;
- a firewall security device operatively connected to the system server, wherein the firewall security device is operable to control the transmission of data to and from the system server via an interconnected network;
- a content management server operatively connected to the system server via the interconnected network, wherein the content management server is configured to store a plurality of content data therein, wherein the content management server is configured to exchange content data with at least the system server via the firewall security device;
- a plurality of non-personal gaming devices, wherein each non-personal gaming device is operatively connected to the content management server, wherein each non-personal gaming device is configured to provide limited duration access to a plurality of users thereof and wherein the plurality of non-personal gaming devices each include a unique device ID;
- a relational database management system server configured to generate a user profile based on received personal user data and operatively connected to the content management server and the plurality of non-personal gaming devices, wherein the relational database management server is configured to store a plurality of user data associated with users of the non-personal gaming devices;
- at least one ad exchange, wherein the at least one ad exchange is operatively connected to at least one programmatic ad provider, wherein the at least one ad exchange is operatively connected to the system server via the interconnected network, wherein the at least one ad exchange is configured to communicate a plurality of targeted advertisements received from at least one programmatic ad provider to the system server for transmission thereof to a selected number of the plurality of non-personal gaming devices;

wherein each non-personal gaming device is further operable to:
- initiate at least one limited duration gaming session for an associated user thereon;
- obtain a plurality of personal user data related to the user, wherein the personal user data comprises data associated with at least one attribute of the user;

transmit at least a portion of the plurality of personal user data and device ID for the non-personal gaming device to the relational database management system server;

display at least one targeted advertisement on an associated display thereof during the user's limited duration gaming session and during when the gaming session is paused, wherein the associated display includes one or more second hardware screens;

wherein the relational database management system server is further operable to:
  generate a user profile based on the received personal user data, wherein the user profile includes at least one attribute of the user;
  transmit the generated user profile and the device ID associated with the user to the system server;

wherein the system server is further operable to:
  transmit the user profile to at least one programmatic ad provider via the at least one ad exchange;
  receive at least one targeted advertisement from at least one programmatic ad provider via the at least one ad exchange, wherein the at least one targeted advertisement is based on at least a portion of the user profile;
  determine which of the plurality of non-personal gaming devices to transmit the at least one targeted advertisement based on the device ID associated with the non-personal gaming device; and
  transmit the at least one targeted advertisement to the specific non-personal gaming device based on the determined device ID associated with the non-personal gaming device for display, wherein each non-personal gaming device comprises:
  a gaming controller operable for controlling the non-personal gaming device;
  a gaming display configured for displaying data thereon the one or more second hardware screens configured for displaying the at least one targeted advertisement thereon; and
  a user input device configured to receive user input, and memory configured to store data therein, wherein the gaming controller is operable to render the at least one target advertisement using a web-enabled video player for display on the one or more second hardware screens, and wherein the at least one ad exchange is operable to permit bidding by a programmatic ad partner to provide at least one targeted advertisement based on the user profile.

10. The system of claim 9, wherein each non-personal gaming device is further operable to, upon display of the at least one targeted advertisement, create proof-of-play data, and the proof-of-play data to the content management server, and
  wherein the content management server is further operable to transmit the proof-of-play data to at least one programmatic ad provider via the system server.

11. The system of claim 9, wherein at least a portion of the personal user data is received from the user via the user input device.

12. The system of claim 9, wherein the at least one attribute is selected from the group consisting of user membership duration, user play history, user behavior, user demographics, and user psychographics.

* * * * *